US009598062B2

(12) United States Patent
Kumar et al.

(10) Patent No.: US 9,598,062 B2
(45) Date of Patent: Mar. 21, 2017

(54) SYSTEM AND METHOD FOR CONTROLLING A VEHICLE

(71) Applicant: General Electric Company, Schenectady, NY (US)

(72) Inventors: Ajith Kuttannair Kumar, Erie, PA (US); David Michael Peltz, Melbourne, FL (US); Eugene A. Smith, Melbourne, FL (US); Paul Kenneth Houpt, Niskayuna, NY (US); Glenn Robert Shaffer, Lawrence Park, PA (US); Joseph Forrest Noffsinger, Grain Valley, MO (US); Brian J. McManus, Palm Bay, FL (US); Jared Cooper, Palm Bay, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/867,842

(22) Filed: Sep. 28, 2015

(65) Prior Publication Data
US 2016/0016566 A1    Jan. 21, 2016

Related U.S. Application Data

(63) Continuation-in-part of application No. 14/005,451, filed as application No. PCT/US2011/068090 on Dec. 30, 2011, now Pat. No. 9,145,145.

(Continued)

(51) Int. Cl.
*B60T 8/24* (2006.01)
*B60T 8/172* (2006.01)
(Continued)

(52) U.S. Cl.
CPC .............. *B60T 8/1705* (2013.01); *B60T 7/12* (2013.01); *B60T 8/172* (2013.01); *B60T 2201/04* (2013.01); *B60T 2270/406* (2013.01)

(58) Field of Classification Search
CPC .......... B60T 8/1705; B60T 7/12; B60T 8/172; B60T 2201/04; B60T 2270/406
(Continued)

(56) References Cited

U.S. PATENT DOCUMENTS 6,353,780 B1 * 3/2002 Hart .................... B60L 15/2009
246/182 A
7,127,345 B2    10/2006 Chen et al.
(Continued)

FOREIGN PATENT DOCUMENTS

CN    1906074 A    1/2007
EP    1522480 A2    4/2005

OTHER PUBLICATIONS

PCT Search Report and Written Opinion issued in connection with corresponding PCT Application No. PCT/US2011/068090 on Jun. 27, 2012.
(Continued)

*Primary Examiner* — Brian P Sweeney
(74) *Attorney, Agent, or Firm* — John A. Kramer; Global Patent Operation

(57) ABSTRACT

A method for vehicle control comprises determining a braking capability of a braking system of a vehicle, and modifying application of at least one control parameter by a control system of the vehicle based on the determined braking capability. Braking capability may be determined by activating the braking system of the vehicle to apply a braking force on the vehicle, and concurrently, applying a level of tractive effort of the vehicle that is sufficient to
(Continued)

overcome the braking force. The braking capability is determined based on the level of tractive effort.

22 Claims, 5 Drawing Sheets

Related U.S. Application Data

(60) Provisional application No. 61/428,960, filed on Dec. 31, 2010.

(51) Int. Cl.
*B60T 8/17* (2006.01)
*B60T 7/12* (2006.01)

(58) Field of Classification Search
USPC .......................................................... 701/533
See application file for complete search history.

(56) References Cited

U.S. PATENT DOCUMENTS

| 2003/0105561 | A1 | 6/2003 | Nickles et al. |
| 2004/0133315 | A1 | 7/2004 | Kumar et al. |
| 2007/0219680 | A1 | 9/2007 | Kumar et al. |
| 2009/0125170 | A1* | 5/2009 | Noffsinger ............... B60L 7/16 701/20 |
| 2009/0255329 | A1 | 10/2009 | Connell et al. |

OTHER PUBLICATIONS

Unofficial English translation of Chinese Office Action issued in connection with corresponding CN Application No. 201180068804.X on Mar. 30, 2015.

AU Examination Report issued in connection with corresponding AU Application No. 2011352018 on Oct. 15, 2015.

* cited by examiner

SYSTEM AND METHOD FOR CONTROLLING A VEHICLE

BACKGROUND OF THE INVENTION

Especially when various on-board systems are integrated with a vehicle braking system for conjointly operating the vehicle, the vehicle may be operated according to a "worst case" assumption of braking capability. The vehicle may be operated according to the assumption that only fifty percent of mechanical braking capability is available and with no dynamic brake capability. Making such assumptions may result in the vehicle being slowed earlier than necessary, which results in a loss of average speed over a full duration of a trip. Additionally, this may result in delay and loss of route capacity, considering that other vehicles also operate of the same route. Furthermore, the actual braking capability may be less than what is assumed, due to discrepancies between actual capabilities and assumed capabilities, brake system failures during a trip, environmental conditions, etc.

One approach currently utilized to assess braking capability of a vehicle is to check the brakes of the vehicle prior to departure to ensure that the brakes are operating. This approach, however, does not provide for a true determination of braking capability or effectiveness. This is because checking for braking ability does not convey any information about how much braking force would be applied in actually using the brakes during motoring, e.g., actual braking pads or shoes may not function properly, thus not being able to apply a full breaking force to wheels the vehicle, even though braking ability is present.

It may be desirable to have a vehicle control system, taking into account braking system capability, that differs from those vehicle control systems that are currently available.

BRIEF DESCRIPTION OF THE INVENTION

Embodiments of the invention relate to vehicles. Other embodiments relate to methods and systems for controlling rail vehicles, automotive vehicles (including driverless, remotely controlled, and driver operated automobiles), or other vehicles.

Embodiments of the present invention relate to systems and methods for vehicle control that determine a braking capability of a vehicle and control the vehicle based on the determined braking capability.

In an embodiment, a system (e.g., a system for controlling a vehicle) includes at least one controller that is operable to determine a braking capability of a braking system of a vehicle, and modify application of at least one control parameter by a control system of the vehicle based on the determined braking capability. (Control parameter refers to a quantity or factor, relating to the vehicle or a trip, which is used by a control system as a basis for controlling the vehicle. Modifying application of the control parameter may include modifying the parameter and applying the modified parameter in the same manner as the parameter before modification, and/or applying the parameter in a different way than the parameter would have been applied previously.) The controller may be part of the vehicle control system, or part of a different system of the vehicle.

In an embodiment, a system (e.g., a system for controlling a vehicle) includes at least one controller that is operable to determine when a vehicle is moving along a route having a grade. ((The grade may be a zero degree grade, a downhill grade, or an uphill grade; route includes travel on roadways, rails, etc.) The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle (e.g., a control parameter used by a control system of the vehicle) based on the determined braking capability.

In an embodiment, a method for vehicle control includes determining (e.g., with at least one controller) a braking capability of a braking system of a vehicle, and modifying application of at least one control parameter by a control system of the vehicle based on the determined braking capability.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability.

In an embodiment, a method for vehicle control includes determining (e.g., with at least one controller) when a vehicle is moving along a route having a grade. The method further includes applying the braking system of the vehicle while on the grade to test a capability of the braking system. The method further includes modifying application (e.g., enforcement) of a control parameter by the vehicle based on a result from the test.

In an embodiment, a system for a vehicle includes a braking capability module configured to determine a braking capability of a braking system of the vehicle. The system further includes a control module operably coupled with the braking capability module and configured to modify application of a control parameter by the control module based on the determined braking capability.

In an embodiment, a system for a vehicle includes a location module configured to identify when a vehicle is moving along a route having a grade. The system further includes a braking capability module configured to command applying a braking system of the vehicle while on the grade to test a capability of the braking system. The system further includes a control module configured to modify application of a control parameter by the control module based on a result from the test.

BRIEF DESCRIPTION OF THE DRAWINGS

Embodiments of the invention may be best understood by reference to the following description taken in conjunction with the accompanying drawing figures wherein.

DETAILED DESCRIPTION OF THE INVENTION

Figure 1:
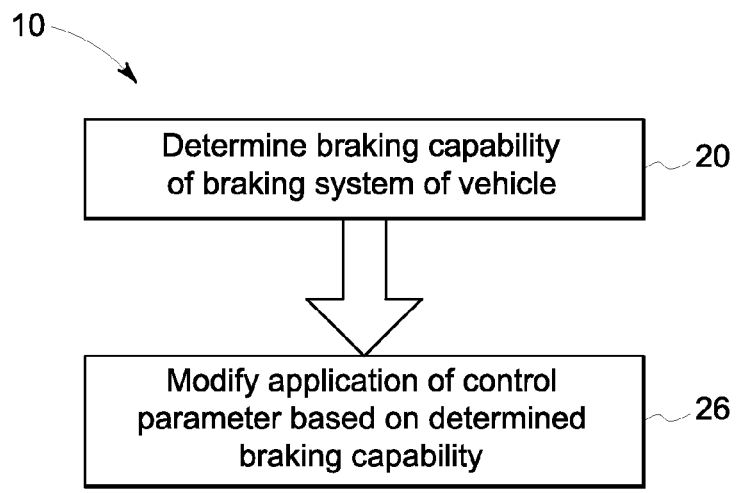
FIG. 1 is a flowchart illustrating a method for vehicle control, according to an embodiment of the invention.

Reference will be made below in detail to exemplary embodiments of the invention, examples of which are illustrated in the accompanying drawings. Wherever possible, the same reference numerals used throughout the drawings refer to the same or like parts; however, the existence of the same or like parts in multiple embodiments does not mean every embodiment of the invention necessarily includes such parts. Exemplary embodiments of the invention solve problems in the art by controlling a vehicle based on a determined condition of a braking system of the vehicle. Additionally, embodiments of the invention can be implemented in numerous ways, including as a system (including a computer processing system), a method (including a computerized method), an apparatus, a computer readable medium, a computer program product, or a data structure tangibly fixed in a computer readable memory. Several embodiments of the invention are discussed below.

Exemplary embodiments of the invention may be used in vehicles, such as, but not limited to, off-highway vehicles, over road transportation systems, rail vehicles, etc. Additionally, unless specifically referred to as a single or individual vehicle, the term vehicle includes vehicle consists, "consist" referring to a group of vehicles mechanically and/or logically/communicatively linked to travel together along a route.

Figure 2:
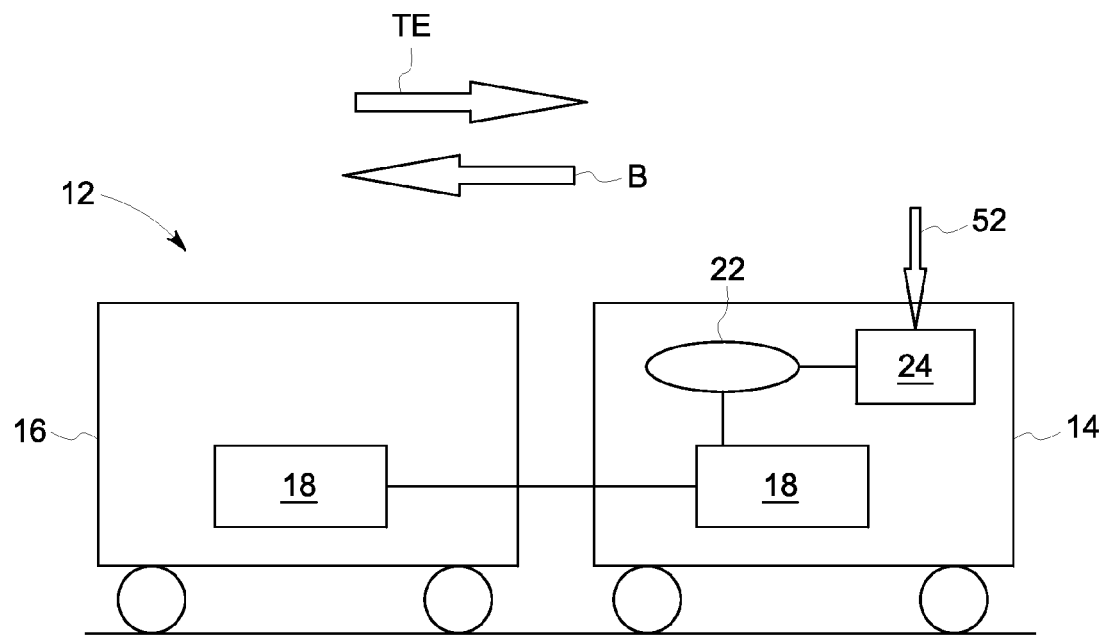
FIG. 2 is a schematic diagram of a vehicle consist, according to an embodiment of the invention.

With reference to FIGS. 1 and 2, an embodiment of the invention relates to a method 10 for controlling a vehicle 12 (in this case a consist including a first unit 14 and a second unit 16) based on a determined braking capability of a braking system 18 of the vehicle. Certain vehicles may include more than one braking mechanism or sub-system. Thus, the use of the term "braking system" may relate to an individual braking mechanism or sub-system in a vehicle or vehicle consist, or plural braking mechanisms or sub-systems collectively. The method 10 comprises determining a braking capability of the braking system 18 of the vehicle 12, at step 20, and modifying application (e.g., enforcement) of at least one control parameter 22 by a control system 24 of the vehicle based on the determined braking capability, at step 26. As noted above, the control parameter 22 comprises a quantity or factor, relating to the vehicle or a trip, which is used by the control system 24 as a basis for controlling the vehicle. Examples of control parameters include maximum allowed speeds of a vehicle, safety thresholds relative to maximum allowed speeds, designated braking profiles for a vehicle (e.g., which specify how a vehicle is to be braked in certain designated situations), factors that are used by an energy management system (e.g., to create a trip plan for a vehicle), and the like. Modifying application of the control parameter may include modifying the parameter and applying the modified parameter the same as the parameter before modification, and/or applying the parameter in a different way than the parameter would have been applied previously.

Figure 3:
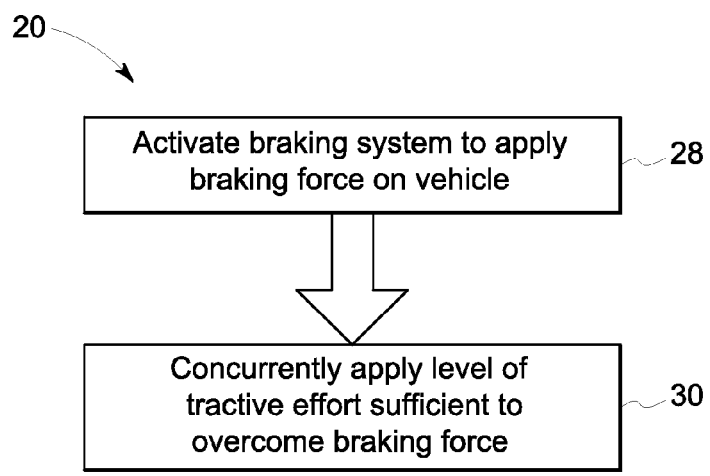
FIG. 3 is a flowchart illustrating a method for vehicle control, according to another embodiment of the invention.

The braking capability may be determined in different manners. With reference to FIGS. 2 and 3, in one embodiment, the step 20 of determining the braking capability comprises a step 28 of activating the braking system 18 of the vehicle to apply a braking force "B" on the vehicle. Activating the braking system 18 may comprise fully activating all braking mechanisms/sub-systems on the vehicle or vehicle consist, or fully activating one braking mechanism or sub-system, or fully activating all those braking mechanisms/sub-systems that can controlled automatically and/or that can be controlled with reasonably certainty about how the braking system will affect deceleration of a vehicle when moving and/or that are configured for use in slowing the vehicle while it is moving. (For example, a manual or other parking brake of an automobile or other vehicle would typically not be activated for assessing braking capability, since it is unpredictable in regards to how it would slow a vehicle, and is neither configured nor intended for slowing a vehicle while it is moving.) In one embodiment, the step of determining the braking capability comprises determining a combined braking capability of air brake (and/or mechanical brake) and dynamic brake portions of the braking system of the vehicle, or only the braking capability of the air brake (and/or mechanical brake) portion. The step 20 of determining the braking capability further comprises, at step 30, concurrently applying a level of tractive effort "TE" of the vehicle sufficient to overcome the braking force. (B and TE are directionally shown in FIG. 2 with the assumption that the vehicle is configured to move from left to right.) The braking capability is determined based on the level of tractive effort.

To elaborate, braking capability is a level of force available to be applied by the braking system 18 for slowing the vehicle. Tractive effort is the pulling or pushing force exerted by a vehicle to move a load (itself and other mass, if any). At the point where the tractive effort overcomes the braking force, this means that the tractive effort is equal to, or just slightly higher than, the braking force. Thus, a measure of tractive effort at this point is indicative of braking capability. As should be appreciated, tractive effort does not necessarily refer to the maximum possible tractive effort of a vehicle (which is a function of vehicle configuration), but rather to the level of tractive effort currently being expended by the vehicle. It is assumed that the maximum possible tractive effort is greater than the maximum braking capability of the braking system. Tractive effort may be measured using force sensors, and/or by leveraging information available to the vehicle traction system. For example, tractive effort may be derived based on the throttle level or other control inputs, which map to the energy demanded of the traction system and the tractive effort, and/or on a per-axle basis based on the torque produced by each motor (determinable based on the electrical signals being applied to the motor and/or on sensor outputs of motor operation) and knowledge of wheel diameter and gear ratio (of gears between the motor and axle).

In embodiments of the vehicle control method, the braking system is activated (as at step 28) when the vehicle is stopped, and the level of tractive effort is gauged (as part of step 30) by identifying when the vehicle starts to move despite the braking force, for determining the braking capability. One example of activating the braking system when the vehicle is stopped is to do so at or before a time of departure of the vehicle. In other embodiments, the braking system is activated when the vehicle is moving. This may be done at times when braking is not needed to slow the vehicle for vehicle control purposes as part of its trip, or when the braking is needed to slow the vehicle for vehicle control purposes. The tractive effort of the vehicle is increased to maintain speed despite the braking, and the braking capability is determined based on the difference between the increased tractive effort and the level of tractive effort before braking (before the tractive effort was increased).

As noted above, embodiments of a control method include a step of modifying application of at least one control parameter 22 by a control system 24 of the vehicle based on the determined braking capability. As further noted, modifying application of the control parameter may include modifying the parameter and applying the modified parameter the same as the parameter before modification, and/or applying the parameter in a different way than the parameter would have been applied previously. As one example, the control system 24 may comprise an energy management system. The energy management system operates based on control parameters that may include information about the vehicle, information about the route of the vehicle, information about logistics (start point, end point, business-based time constraints, goal of the trip), and/or physics or other models of how the vehicle operates. The goal of the trip may be to save fuel or to arrive at a designated stop point at a given time. The energy management system may be configured, as part of the physics or other models of vehicle operation, to operate based on an assumed braking capability of the vehicle. According to one aspect of the invention, instead of operating based on an assumed braking capability, the energy management system would receive information of the determined braking capability of the vehicle (i.e., an indication of actually how effective the braking system is in operation of the vehicle) and operate based on the determined braking capability. Thus, the control parameter would be a vehicle braking information used by the energy management system and the step of modifying application of the vehicle braking information would comprise using the determined braking capability instead of an assumed or default braking capability.

As an example, the step of modifying application of the at least one control parameter based on the determined braking capability may comprise modifying a designated speed and/or time of the trip. For example, if the vehicle is designated to travel at a first speed under the default of an assumed braking capability, then according to aspects of the invention, it may be the case that the vehicle is instead designated to travel at a second speed based on the determined (actual) braking capability.

Figure 4:
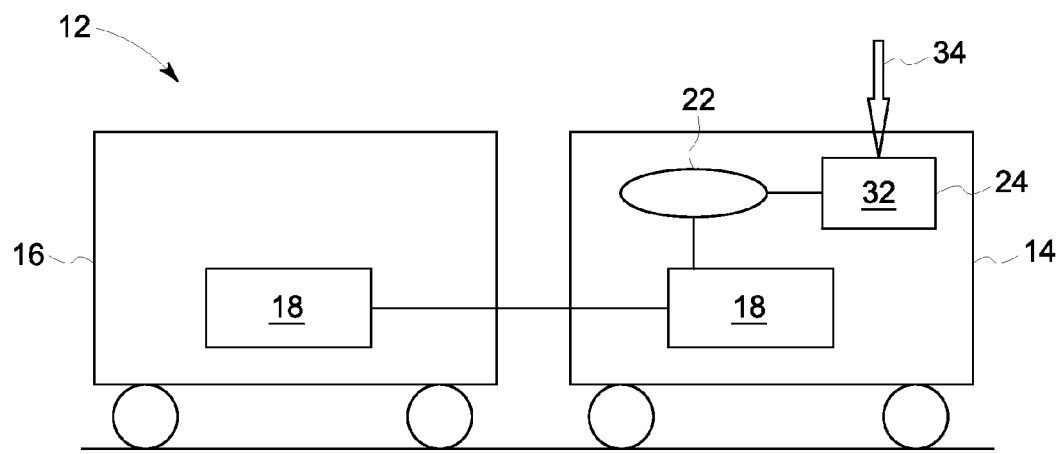
FIG. 4 is a schematic diagram of a vehicle consist, according to another embodiment of the invention.
Figure 5:
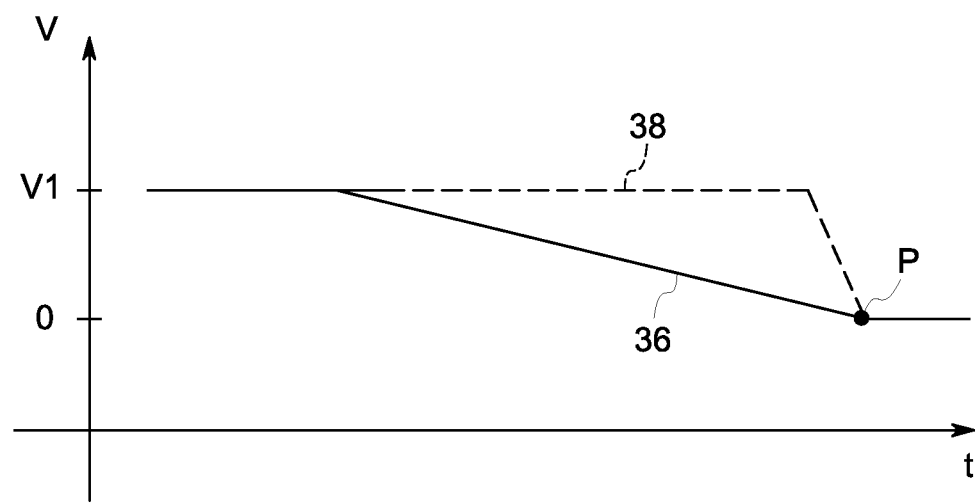
FIG. 5 is a velocity versus time profile showing two braking profiles.

As an example, with reference to FIG. 4, the control system 24 may comprise a positive vehicle control or other vehicle safety system 32. The vehicle safety system 32 is configured to automatically control the vehicle 12, such as initiating braking of the vehicle, responsive to receiving a signal 34 from off-board the vehicle or receiving a signal from an on-board safety detector configured to detect obstructions in the route, potential side collision obstructions, or other safety risks that require stopping or slowing the vehicle. (The signal may be generated off board for purposes of braking the vehicle for safety reasons, such as the vehicle violating a signal, the vehicle exceeding a designated speed limit, or to account for the unplanned movement of other vehicles, e.g., an anticipated stop of another vehicle ahead of the vehicle or another obstruction in the traveling path of the vehicle.) The vehicle safety system may control braking of the vehicle according to a braking profile, which may specify an end target speed (e.g., relatively slow speed, or stop), a target location for stop, how soon the vehicle must commence braking, and/or how steep of a deceleration rate is allowed. In addition, the vehicle safety system may take control of the vehicle from an operator in order to stop the vehicle for safety reasons according to a braking profile. According to an aspect of the invention instead of following a default braking profile, the vehicle safety system would receive information of the determined braking capability of the vehicle, and brake the vehicle based on the determined braking capability (while still meeting any set/"hard" constraints). This might allow the vehicle to be braked later than it would have been braked based on the default braking profile, or at a steeper deceleration rate (i.e., braked harder), thus providing time for the safety situation to possibly be resolved without having to slow the vehicle or take control of the vehicle from a vehicle operator, while still allowing the vehicle to be actually braked to meet the set/hard safety constraints if the safety situation is not resolved. Thus, the control parameter would be a default braking profile used by the vehicle safety system to brake the vehicle under certain designated conditions, and the step of modifying application of the braking profile would comprise modifying the default braking profile, for use in braking the vehicle, based on the determined braking capability (i.e., using a modified braking profile instead of a default braking profile). The modified braking profile might be configured for a less conservative braking strategy (e.g., steeper deceleration rates, and/or commencing braking later) relative to the default braking profile. One example is shown in FIG. 5, which illustrates a relatively more conservative default braking profile 36 for braking to a stop point "P," versus a relatively less conservative modified braking profile 38.

Figure 6:
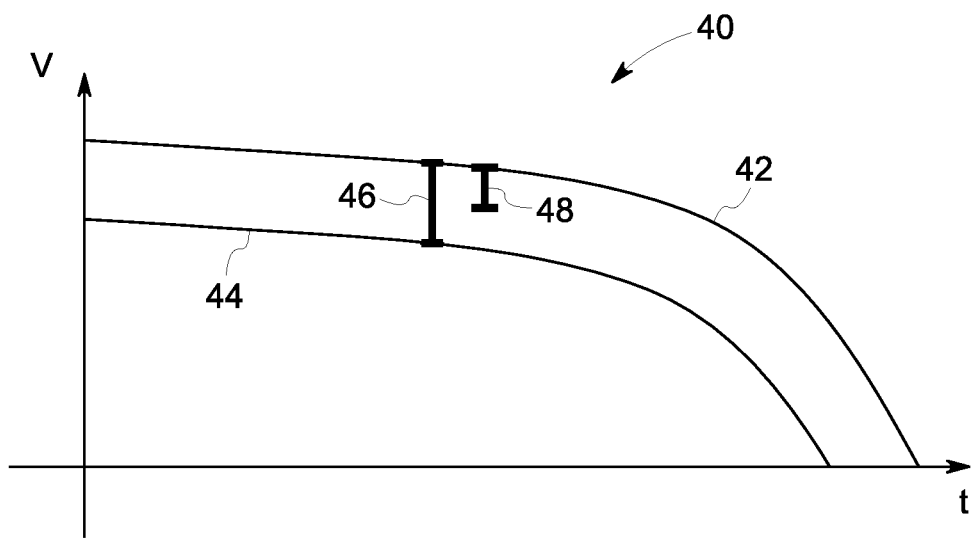
FIG. 6 is a velocity versus time profile showing modification of a default safety threshold to a maximum allowed speed profile.

In another embodiment, with reference to FIG. 6, the vehicle 12 is controlled according to a speed profile 40 that specifies one or more maximum allowed speeds 42 of the vehicle as a function of location and/or time. (The method illustrated in FIG. 6 is one example of modifying application of a speed enforcement parameter, in this case a safety threshold below a maximum allowed speed profile.) The control parameter comprises a designated speed 44 of the vehicle (speed to which a vehicle is controlled); the designated speed 44 is less than the maximum allowed speed 42 for a current location and/or time of the vehicle by at least a safety threshold 46. In other words, the speed profile sets maximum allowed speeds, but the vehicle is controlled to a speed that is below the maximum allowed speed, for a given location and/or time, to provide a safety margin (the safety threshold 46) to reduce the likelihood of the vehicle exceeding the maximum allowed speed. According to the method, the designated speed 44 is modified, based on the determined braking capability, to a vehicle speed 48 within the safety threshold. Thus, due to having knowledge of the braking capability, the vehicle is controlled to a speed, for a given location and/or time, that is at or below the maximum allowed speed but above the safety threshold speed 46. (In other words, the magnitude of the safety threshold 46 is reduced based on the determined braking capability.) This principle, also, can be applied in the inverse to reduce speed based on the actual braking ability.

Figure 7:
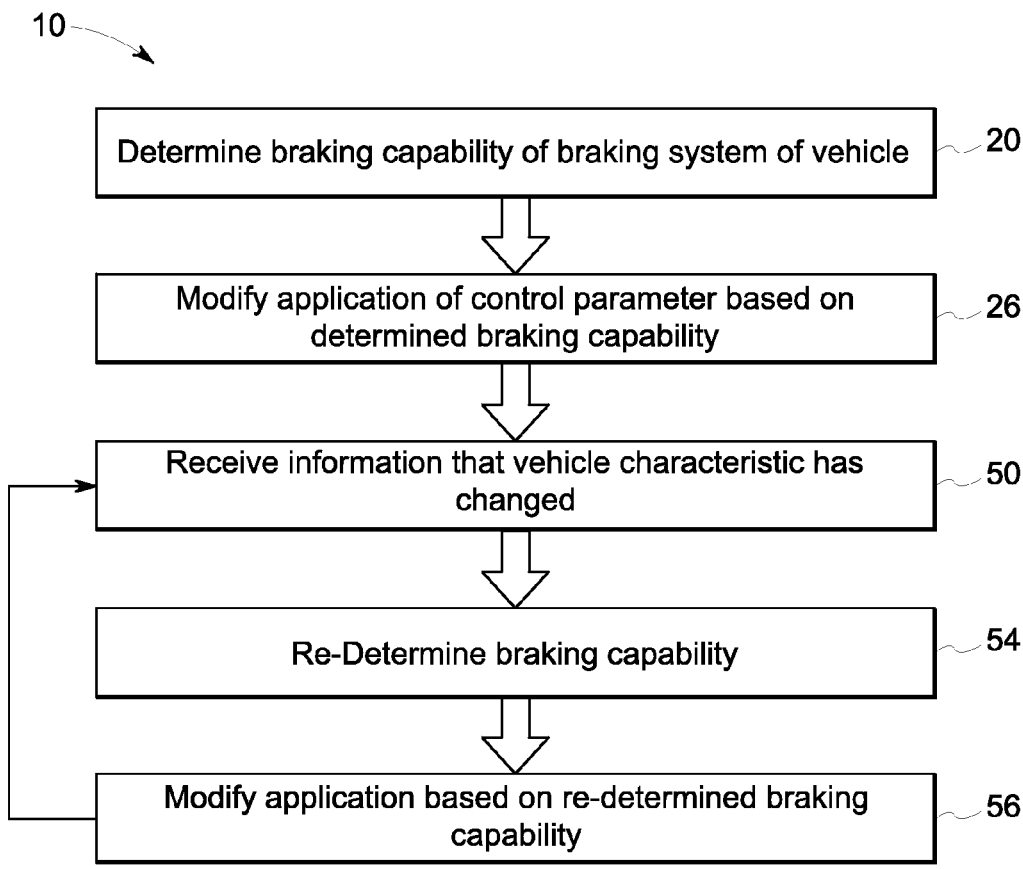
FIG. 7 is a flowchart of a method for vehicle control, according to another embodiment of the invention.

In an embodiment of the control method, the braking capability is re-determined, and application of the at least one control parameter is modified based on the re-determined braking capability, when (or whenever) vehicle weight or another vehicle characteristic changes. This is because a change in a vehicle characteristic may have an effect on braking capability, e.g., lower weight generally means it is easier to slow the vehicle. For example, with reference to FIGS. 2 and 7, the method further comprises a step 50 of receiving information 52 indicative of a characteristic of the vehicle having changed. Responsive to receiving the information, the method comprises, at step 54, re-determining the braking capability of the braking system of the vehicle, and, as step 56, modifying application of the at least one control parameter by the control system of the vehicle based on the re-determined braking capability. Characteristics for initiating re-determination of the braking capability may include, but are not limited to, weight of the vehicle, a mechanical issue is experienced with the vehicle, etc. Any of the approaches discussed herein may be initiated or otherwise used responsive to a vehicle characteristic changing.

In embodiments, determining the braking capability additionally or alternatively comprises determining a stopping distance of the vehicle 12. The stopping distance may then be used as a basis for controlling the vehicle, e.g., braking is commenced at or before the vehicle is the stopping distance away from a designated stop point. A simplified model for determining stopping distance is stopping distance=$(0.5MV2)/f$, where M is the mass of the vehicle, V is the velocity of the vehicle, and f is the available braking force, e.g., determined as described herein.

Figure 8:
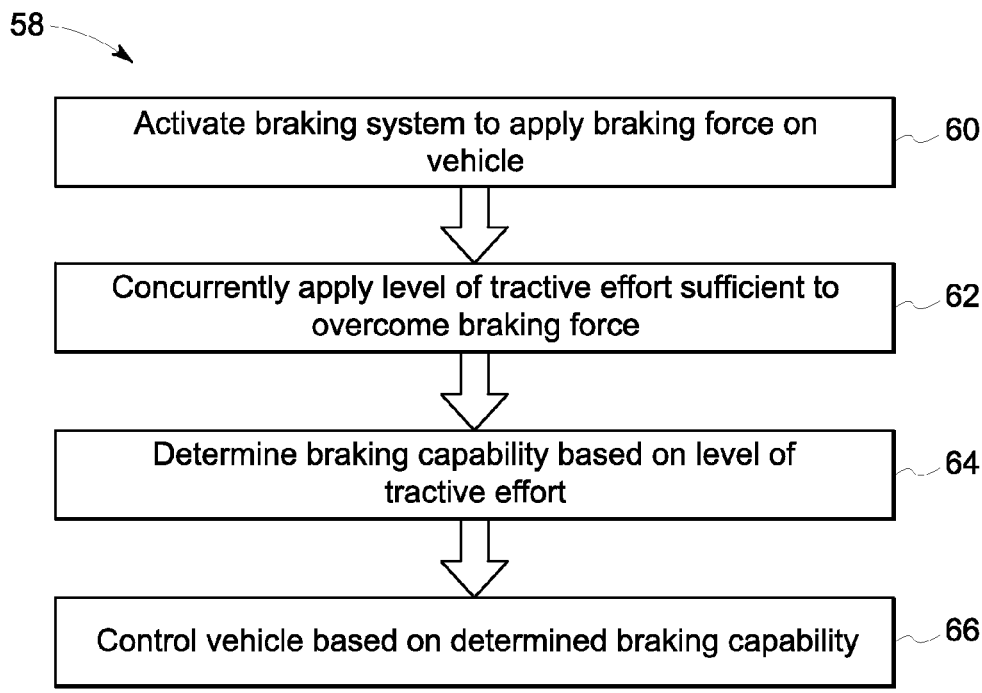
FIG. 8 is a flowchart of a method for vehicle control, according to another embodiment of the invention.

The method of FIG. 3 may be applied outside the context of modifying application of a control parameter. For example, with reference to FIG. 8, another embodiment of a vehicle control method 58 comprises a step 60 of activating a braking system of a vehicle to apply a braking force on the vehicle. The method further comprises a step 62 of concurrently applying a level of tractive effort of the vehicle sufficient to overcome the braking force, and a step 64 of determining a braking capability of the vehicle based on the level of tractive effort. The method further comprises a step 66 of controlling the vehicle based on the determined braking capability. (Other portions of the present description are applicable to the method of FIG. 8. For example, the braking system may be activated when the vehicle is stopped, and the level of tractive effort may be gauged by identifying when the vehicle starts to move despite the braking force.)

Figure 9:
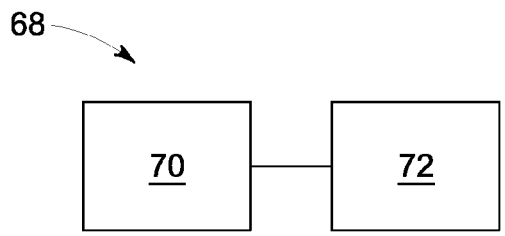
FIG. 9 is a schematic diagram of a vehicle control system, according to another embodiment of the invention.

With reference to FIG. 9, another embodiment relates to a system 68 for a vehicle. The system comprises a braking capability module 70 configured to determine a braking capability of a braking system of the vehicle. The system additionally comprises a control module 72 operably coupled with the braking capability module and configured to modify application of a control parameter by the control module based on the determined braking capability. One or both of the braking capability module 70 and/or the control module 72 may be implemented as part of the control system 24. Additionally, one or both of the braking capability module 70 and/or the control module 72 may be further configured to carry out one or more of the other methods described herein.

Figure 10:
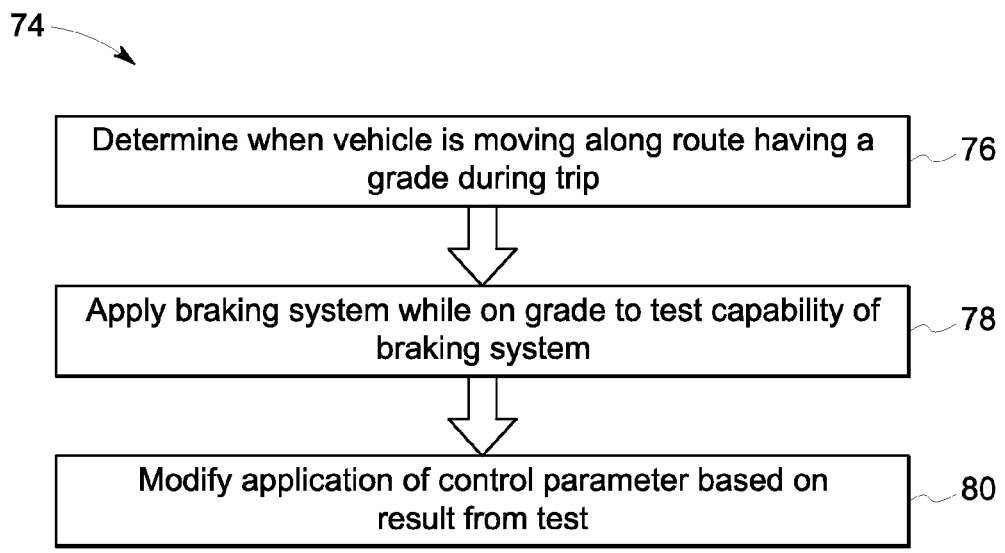
FIG. 10 is a flowchart of a method for vehicle control, according to another embodiment of the invention.

In another embodiment, with reference to FIG. 10, a method for vehicle control 74 comprises a step 76 of determining when a vehicle is moving along a route having a grade. (The grade may be a zero degree grade, a downhill grade, or an uphill grade.) The method further comprises, at step 78, applying the braking system of the vehicle while on the grade to test a capability of the braking system. The brakes may be applied additionally, separately, or independently of any applications of the braking system for traction/movement control purposes. The method further comprises, at step 80, modifying enforcement or other application of a control parameter by the vehicle based on a result from the test. (The enforcement or application of the control parameter may be modified as described herein in regards to other embodiments.)

In an embodiment of the method of FIG. 10, the braking system is applied to exceed an amount of braking applied by a control system of the vehicle for purposes of controlling the vehicle to traverse the grade. Thus, while the vehicle is traversing the grade, the control system may apply brakes for traction/movement control purposes, i.e., to slow the vehicle in order to safely traverse the grade. According to the method, during this time, the brakes are applied more than needed for the traction/movement control purposes, in order to test the braking capability of the braking system. In another aspect, the braking system is applied when the vehicle is traversing the grade, but at a time when the brakes are not being applied for traction/movement control purposes.

In an embodiment of the method of FIG. 10, the step of determining when the vehicle is moving along the route comprises determining when the vehicle is moving along a downhill grade of the route. The braking system is applied while the vehicle is on the downhill grade to test the capability of the braking system. It is possible to determine when the vehicle is traversing the downhill grade by correlating a current location of the vehicle (e.g., determined via GPS) with a route database that provides information of characteristics of the route of the vehicle. (Such route databases can be used in many applications for energy management system calculations.)

In an embodiment of the method of FIG. 10, the braking system is applied to an extent and/or for a duration sufficient to test the capability of the braking system but not to significantly slow down the vehicle versus a speed of the vehicle before the braking system was applied. This may be accomplished by testing the braking system on a downhill grade when the vehicle is not being braked for traction control/movement purposes. That is, the braking may be matched to (or applied less than) the accelerating force exerted on the vehicle by gravity on the downhill. Thus, as the vehicle accelerates due to gravity, the brakes are applied for testing, slowing the vehicle, but with the net effect being no significant reduction in speed. According to one aspect, a significant speed reduction is more than 5%. In another aspect, a significant speed reduction is more than 2%. In another aspect, a significant speed reduction is more than 1%. (That is, for testing the braking on a downhill grade, the speed is reduced by no more than 5%, or 2%, or 1%.) The exact level allowed may depend on the characteristics of the vehicle, the speed range of the vehicle (e.g., higher speeds allow for a greater percentage decrease, since the vehicle is still going relatively fast), and/or what is desired, from a business, vehicle operation, and/or energy management perspective, for a given implementation. For example, a business decision may be made that testing takes priority over speed reductions, allowing, therefore, for a 5% max reduction. As another example, an energy management system may dictate that the speed be reduced by no more than 1% to avoid excess fuel usage.

In an embodiment of the method of FIG. 10, a duration of applying the braking system to test the capability of the braking system is determined based on a slope of the downward grade. For example, for a steeper slope, it may be possible to brake the vehicle harder, for determining braking capability, but for a shorter duration, versus braking the vehicle on a less steep slope.

Figure 11:
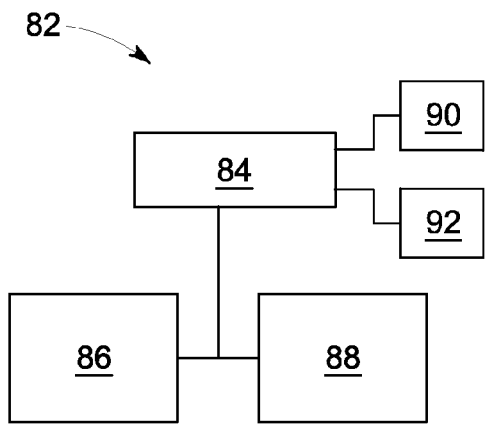
FIG. 11 is a schematic diagram of a vehicle control system, according to another embodiment of the invention.

FIG. 11 shows an embodiment of a system 82 for a vehicle. The system comprises a location module 84 configured to identify when a vehicle is moving along a route having a grade. The system additionally comprises a braking capability module 86 configured to command applying a braking system of the vehicle while on the grade to test a capability of the braking system. The system additionally comprises a control module 88 configured to modify application of a control parameter by the control module based on a result from the test. The location module 84 may include, or have access to, a GPS module or other geographic position determination device 90 and/or a route database 92. Alternatively, travel on a grade may be determined using a tilt sensor or the like.

The system 82 may be further configured to carry out one or more other methods as described herein. For example, the location module may be configured to identify when the vehicle is moving along a downhill grade of the route, and the braking capability module may be configured to command applying the braking system of the vehicle while on the downhill grade.

The methods of FIGS. 1 and 10, and related systems, may determine braking capability in ways other than as described in FIG. 3. For example, braking capability may be determined by fully or otherwise applying the braking system, or sub-systems of interest, and calculating the braking capability based on a change in vehicle speed over a given distance, as a function of vehicle mass. A simplified model is braking force=$0.5M(V1^2-V2^2)/d$, where M is vehicle mass, V1 is a starting velocity of the vehicle, V2 is an ending velocity of the vehicle, and d is the distance traveled while slowing down from V1 to V2 (as determined, for example, using GPS or wayside markers).

As noted, determining the braking capability of the braking system of the vehicle may involve determining the overall braking capability (e.g., braking during movement capability, not factoring in parking brakes or the like), or the braking capability of one or more sub-systems of the braking system. For example, determining the braking capability may comprise determining the braking capability of each braking sub-system of a vehicle at a time of departure of the vehicle. Determining the braking capability of each braking system of the vehicle may comprise determining the braking capability at a time each braking system of the vehicle is applied as needed during a trip. Alternatively, it may comprise testing the braking capability of the vehicle at a time braking of the vehicle is not required. The testing may be carried out using a very brief application of at least one braking sub-system, where the test is so brief so as not to significantly slow the vehicle. The test may be done at a location where gravity experienced by the vehicle, such as traveling downhill, may further minimize any reduction in speed during the test.

Modifying enforcement or other application of a control parameter by the vehicle based on the determined braking capability may comprise modifying a speed enforcement element (such as, but not limited to, a speed enforcement algorithm), an element that creates, on board the vehicle, a modified trip as the vehicle is motoring, and/or an element that enforces a desired speed and time. Modifying enforcement or other application may also comprise using airbrake or mechanical brake application timing to include vehicle consist/distributed power (DP) position wherein braking is different, since braking is applied from both ends of the vehicle as opposed to just one end of the vehicle.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The at least one controller is further operable to activate the braking system of the vehicle to apply a braking force on the vehicle and to concurrently apply a level of tractive effort of the vehicle sufficient to overcome the braking force, and to determine the braking capability based on the level of tractive effort.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The at least one controller is further configured to determine when the vehicle is moving along a downhill grade of the route and to active the braking system while the vehicle is on the downhill grade to determine the braking capability.

In an embodiment, the at least one controller is configured activate the braking system while the vehicle is on the downhill grade to an extent and/or for a duration sufficient to determine the braking capability but not to significantly slow down the vehicle versus a speed of the vehicle before the braking system was activated. The duration of activating the braking system to determine the braking capability may be determined based on a slope of the downhill grade.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The at least one controller comprises a vehicle safety system configured to control braking of the vehicle responsive to receiving a signal from off board the vehicle or from an on-board safety detector. Also, the at least one control parameter comprises a default braking profile of the vehicle safety system. The at least one controller is configured to modify the default braking profile to a modified braking profile based on the determined braking capability. The modified braking profile may be less conservative than the default braking profile.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The at least one controller is configured to control the vehicle according to a speed profile that specifies one or more maximum allowed speeds of the vehicle as a function of location and/or time. The at least one control parameter comprises a designated speed of the vehicle, the designated speed being less than the maximum allowed speed for a current location and/or time of the vehicle by at least a safety threshold. The at least one controller is configured to modify the designated speed, based on the determined braking capability, to a vehicle speed within the safety threshold.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The at least one controller is configured to receive information indicative of a characteristic of the vehicle having changed. The at least one controller the further configured, responsive to receiving the information, to re-determine the braking capability of the braking system of the vehicle and modify application of the at least one control parameter based on the braking capability that is re-determined.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The vehicle is a rail vehicle, and the at least one controller is operable to determine the braking capability as a combined braking capability of air brake and dynamic brake portions of the braking system of the rail vehicle.

In an embodiment, a system (e.g., system for controlling a vehicle) includes at least one controller that is operable to determine when a vehicle is moving along a route having a grade. The at least one controller is further operable to determine a braking capability of a braking system of the vehicle by activating the braking system at a time when braking of the vehicle is not required for traction or movement control purposes of the vehicle on the grade, and to modify application of at least one control parameter of the vehicle based on the determined braking capability. The vehicle is an automotive vehicle (e.g., automobile), and the at least one controller is operable to determine the braking capability as at least one of a braking capability of a mechanical brake portion of the braking system of the automotive vehicle or a combined braking capability of the mechanical brake portion and a regenerative brake portion of the braking system of the automotive vehicle.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The step of determining the braking capability includes activating the braking system of the vehicle to apply a braking force on the vehicle, and concurrently applying a level of tractive effort of the vehicle sufficient to overcome the braking force. The braking capability is determined based on the level of tractive effort.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The step of determining when the vehicle is moving along the route having the grade comprises determining when the vehicle is moving along a downhill grade of the route. The braking system is activated while the vehicle is on the downhill grade to determine the braking capability. The braking system may be activated while the vehicle is on the downhill grade to an extent and/or for a duration sufficient to determine the braking capability but not to significantly slow down the vehicle versus a speed of the vehicle before the braking system was activated. Further, the duration of activating the braking system to determine the braking capability may be determined based on a slope of the downhill grade.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The at least one controller comprises a vehicle safety system configured to control braking of the vehicle responsive to receiving a signal from off board the vehicle or from an on-board safety detector. The at least one control parameter comprises a default braking profile of the vehicle safety system. The default braking profile is modified to a modified braking profile based on the determined braking capability. The modified braking profile may be less conservative than the default braking profile.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The vehicle is controlled according to a speed profile that specifies one or more maximum allowed speeds of the vehicle as a function of location and/or time. The control parameter comprises a designated speed of the vehicle, the designated speed being less than the maximum allowed speed for a current location and/or time of the vehicle by at least a safety threshold. The designated speed is modified, based on the determined braking capability, to a vehicle speed within the safety threshold.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The method further includes, with the at least one controller, receiving information indicative of a characteristic of the vehicle having changed, and responsive to receiving the information, with the at least one controller, re-determining the braking capability of the braking system of the vehicle, and modifying application of the at least one control parameter based on the re-determined braking capability.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The vehicle is a rail vehicle, and the step of determining the braking capability comprises determining a combined braking capability of air brake and dynamic brake portions of the braking system of the rail vehicle.

In an embodiment, a method includes, with at least one controller, determining when a vehicle is moving along a route having a grade, and determining a braking capability of a braking system of the vehicle by activating the braking system at a time when braking of the vehicle is not required for traction or movement control purposes of the vehicle on the grade. The method further includes, with the at least one controller, modifying application of at least one control parameter of the vehicle based on the determined braking capability. The vehicle is an automotive vehicle (e.g., automobile), and the step of determining the braking capability comprises determining the braking capability as at least one of a braking capability of a mechanical brake portion of the braking system of the automotive vehicle or a combined braking capability of the mechanical brake portion and a regenerative brake portion of the braking system of the automotive vehicle.

As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively or additionally, a module may include a hard-wired device that performs operations based on hard-wired logic of the device. The module(s) shown in the attached figures may represent the hardware that operates based on software or hardwired instructions, the software that directs hardware to perform the operations, or a combination thereof.

The exemplary methods described herein may be implemented as sets of instructions stored on non-transient electronically readable media, for execution by a processor (the processor accesses the media and instructions, and performs control functions based on the contents of the instructions). Each element set forth in the flowcharts of the drawings may be implemented as a software module specific to performing the function of the element.

An apparatus, such as a data processing system, including a CPU, memory, I/O, program storage, a connecting bus, and other appropriate components, could be programmed or otherwise designed to facilitate the practice of exemplary embodiments of the method of the invention. Such a system would include appropriate program means (sets of instructions) for executing the method of the invention. Also, an article of manufacture, such as a pre-recorded disk, computer readable media, or other similar computer program product, for use with a data processing system, could include a storage medium and program means (sets of instructions) recorded thereon for directing the data processing system to facilitate the practice of the method of the invention. Such apparatus and articles of manufacture also fall within the spirit and scope of the invention.

Broadly speaking, a technical effect is to determine a condition of the braking system of a vehicle and to use the condition as a basis for controlling movement of the vehicle along a route. Exemplary embodiments of the invention may be described in the general context of computer-executable instructions, such as program modules, being executed by a device, such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. For example, the software programs that underlie exemplary embodiments of the invention can be coded in different programming languages, for use with different devices, or platforms. It will be appreciated, however, that the principles that underlie exemplary embodiments of the invention can be implemented with other types of computer software technologies as well.

Moreover, embodiments of the invention may be practiced with other computer system configurations, multiprocessor systems, microprocessor-based or programmable consumer electronics, minicomputers, mainframe computers, and the like. Exemplary embodiments of the invention may also be practiced in distributed computing environments where tasks are performed by processing devices located at different locations on board of a vehicle, that are linked through at least one communications network. In a distributed computing environment, program modules may be located in both local and remote computer storage media including memory storage devices.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
   at least one controller operable to
   determine when a vehicle is moving along a route having a grade,
   determine a braking capability of a braking system of the vehicle by activating the braking system at a time when braking of the vehicle is not required for traction or movement control purposes of the vehicle on the grade, and
   modify application of at least one control parameter of the vehicle based on the determined braking capability.

2. The system of claim 1, wherein the at least one controller is operable to activate the braking system of the vehicle to apply a braking force on the vehicle and to concurrently apply a level of tractive effort of the vehicle sufficient to overcome the braking force, and wherein the at least one controller is configured to determine the braking capability based on the level of tractive effort.

3. The system of claim 1, wherein the at least one controller is configured to determine when the vehicle is moving along a downhill grade of the route and to active the braking system while the vehicle is on the downhill grade to determine the braking capability.

4. The system of claim 3, wherein the at least one controller is configured activate the braking system while the vehicle is on the downhill grade to an extent and/or for a duration sufficient to determine the braking capability but not to significantly slow down the vehicle versus a speed of the vehicle before the braking system was activated.

5. The system of claim 4, wherein the duration of activating the braking system to determine the braking capability is determined based on a slope of the downhill grade.

6. The system of claim 1, wherein:
   the at least one controller comprises a vehicle safety system configured to control braking of the vehicle responsive to receiving a signal from off board the vehicle or from an on-board safety detector;
   the at least one control parameter comprises a default braking profile of the vehicle safety system; and
   the at least one controller is configured to modify the default braking profile to a modified braking profile based on the determined braking capability.

7. The system of claim 6, wherein the modified braking profile is less conservative than the default braking profile.

8. The system of claim 1, wherein:
   the at least one controller is configured to control the vehicle according to a speed profile that specifies one or more maximum allowed speeds of the vehicle as a function of location and/or time;
   the at least one control parameter comprises a designated speed of the vehicle, the designated speed being less than the maximum allowed speed for a current location and/or time of the vehicle by at least a safety threshold; and
   the at least one controller is configured to modify the designated speed, based on the determined braking capability, to a vehicle speed within the safety threshold.

9. The system of claim 1, wherein:
   the at least one controller is configured to receive information indicative of a characteristic of the vehicle having changed; and
   the at least one controller the further configured, responsive to receiving the information, to re-determine the braking capability of the braking system of the vehicle and modify application of the at least one control parameter based on the braking capability that is re-determined.

10. The system of claim 1, wherein the vehicle is a rail vehicle, and the at least one controller is operable to determine the braking capability as a combined braking capability of air brake and dynamic brake portions of the braking system of the rail vehicle.

11. The system of claim 1, wherein the vehicle is an automotive vehicle, and the at least one controller is operable to determine the braking capability as at least one of a braking capability of a mechanical brake portion of the braking system of the automotive vehicle or a combined braking capability of the mechanical brake portion and a regenerative brake portion of the braking system of the automotive vehicle.

12. A method comprising:
with at least one controller, determining when a vehicle is moving along a route having a grade;
with the at least one controller, determining a braking capability of a braking system of the vehicle by activating the braking system at a time when braking of the vehicle is not required for traction or movement control purposes of the vehicle on the grade; and
with the at least one controller, modifying application of at least one control parameter of the vehicle based on the determined braking capability.

13. The method of claim 12, wherein the step of determining the braking capability comprises:
with the at least one controller, activating the braking system of the vehicle to apply a braking force on the vehicle; and
with the at least one controller, concurrently applying a level of tractive effort of the vehicle sufficient to overcome the braking force, wherein the braking capability is determined based on the level of tractive effort.

14. The method of claim 12, wherein the step of determining when the vehicle is moving along the route having the grade comprises, with the at least one controller, determining when the vehicle is moving along a downhill grade of the route, and wherein the braking system is activated while the vehicle is on the downhill grade to determine the braking capability.

15. The method of claim 14, wherein the braking system is activated while the vehicle is on the downhill grade to an extent and/or for a duration sufficient to determine the braking capability but not to significantly slow down the vehicle versus a speed of the vehicle before the braking system was activated.

16. The method of claim 15, wherein the duration of activating the braking system to determine the braking capability is determined based on a slope of the downhill grade.

17. The method of claim 12, wherein:
the at least one controller comprises a vehicle safety system configured to control braking of the vehicle responsive to receiving a signal from off board the vehicle or from an on-board safety detector;
the at least one control parameter comprises a default braking profile of the vehicle safety system; and
the default braking profile is modified to a modified braking profile based on the determined braking capability.

18. The method of claim 17, wherein the modified braking profile is less conservative than the default braking profile.

19. The method of claim 12, wherein:
the vehicle is controlled according to a speed profile that specifies one or more maximum allowed speeds of the vehicle as a function of location and/or time;
the control parameter comprises a designated speed of the vehicle, the designated speed being less than the maximum allowed speed for a current location and/or time of the vehicle by at least a safety threshold; and
the designated speed is modified, based on the determined braking capability, to a vehicle speed within the safety threshold.

20. The method of claim 12, further comprising:
with the at least one controller, receiving information indicative of a characteristic of the vehicle having changed; and
responsive to receiving the information, with the at least one controller, re-determining the braking capability of the braking system of the vehicle, and modifying application of the at least one control parameter based on the re-determined braking capability.

21. The method of claim 12, wherein the vehicle is a rail vehicle, and the step of determining the braking capability comprises determining a combined braking capability of air brake and dynamic brake portions of the braking system of the rail vehicle.

22. The method of claim 12, wherein the vehicle is an automotive vehicle, and the step of determining the braking capability comprises determining the braking capability as at least one of a braking capability of a mechanical brake portion of the braking system of the automotive vehicle or a combined braking capability of the mechanical brake portion and a regenerative brake portion of the braking system of the automotive vehicle.

* * * * *